(No Model.)

C. F. RUFF.
PACKING, LUBRICATING, AND COOLING THE PISTONS OF AIR COMPRESSORS.

No. 296,462.      Patented Apr. 8, 1884.

WITNESSES:
Theo. G. Hoster
C. Sedgwick

INVENTOR:
C. F. Ruff
BY Munn & Co.
ATTORNEYS.

UNITED STATES PATENT OFFICE.

CHARLES F. RUFF, OF PHŒNIXVILLE, PENNSYLVANIA.

PACKING, LUBRICATING, AND COOLING THE PISTONS OF AIR-COMPRESSORS.

SPECIFICATION forming part of Letters Patent No. 296,462, dated April 8, 1884.

Application filed August 22, 1883. (No model.)

*To all whom it may concern:*

Be it known that I, CHARLES F. RUFF, of Phœnixville, in the county of Chester and State of Pennsylvania, have invented a new and useful Improvement in Packing, Lubricating, and Cooling the Piston of Air-Compressors, of which the following is a full, clear, and exact description.

The object of my invention is to provide certain new and useful improvements in lubricating, packing, and cooling pistons of air-compressors.

The invention consists in a piston provided with a series of annular grooves for receiving water, which piston works in a cylinder provided with a larger annular groove in which water circulates, the water in the several grooves making a close joint, and packing, cooling, and lubricating the piston.

Reference is to be had to the accompanying drawings, forming a part of this specification, in which similar letters of reference indicate corresponding parts in both the figures.

Figure 1:
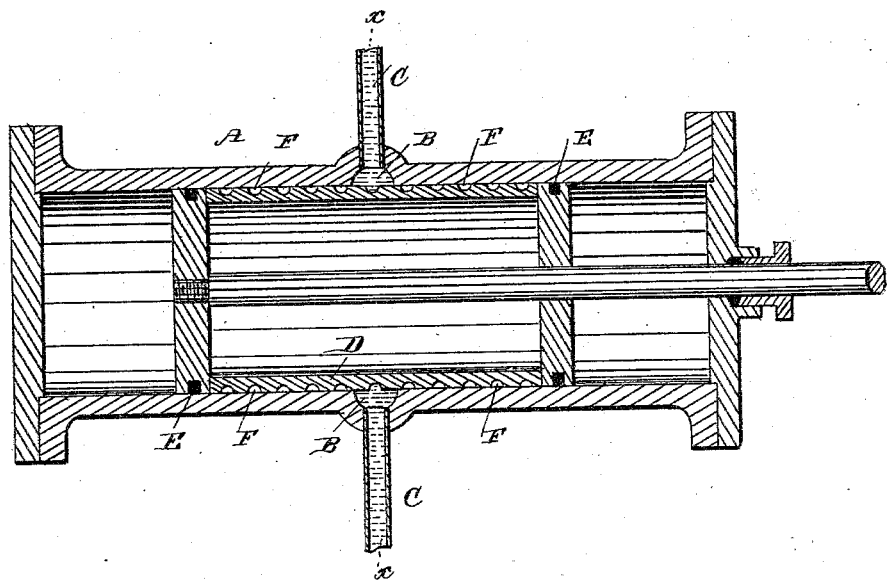
Figure 2:
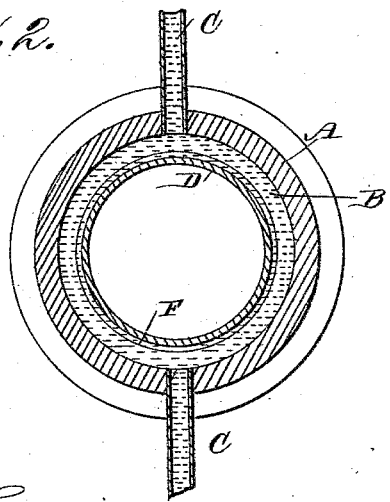

Figure 1 is a longitudinal sectional elevation of the piston and cylinder of my improved air-compressor. Fig. 2 is a cross-sectional elevation of the same on the line $x\,x$, Fig. 1.

The cylinder A is provided in its inner surface and at the middle with an annular groove, B, of greater or less width or depth, with which groove pipes C are connected at diametrically opposite points, one of which pipes conducts water into the groove, through which it circulates and then passes from the groove through the other pipe. The cylindrical piston D is provided with an annular groove at each end, which end grooves contain packing-rings E, of rubber, leather, metal, cotton, or any othe suitable material. Between the ends the pisto is provided with a series of annular grooves F, which are filled with water from the groov B. The water in the grooves F lubricates th piston, and, with the packing-ring E, forms close and tight joint, and the water in th grooves B F keeps the piston and the cylir der cool. The water circulates in the groove B and the pipes C, and thus the water in th grooves F will be changed after each strok The cylinder can stand horizontally or vert cally, or can be inclined vertically or horizor tally, and the number of grooves in the pisto can be varied as may be desired.

I am aware that a piston provided at eac end with a packing-ring and intermediate ar nular grooves is not new, and I do not desir to claim such as of my invention.

Having thus described my invention, I clair as new and desire to secure by Letters Patent—

1. The combination, with the cylinder A provided on its inside, at the center, with a annular groove, B, and inlet and outlet pipe C C on the outer opposite sides of the cylir der and communicating with said groove, a suitably-packed piston, substantially as se forth.

2. The combination, with the piston pr vided with a series of annular grooves, F, the cylinder A, having an internal centr groove, B, and the outlet and inlet pipes C C substantially as set forth.

CHARLES F. RUFF.

Witnesses:
JOHN A. KELLEY,
ROBERT M. McFARLAN.